Apr. 3, 1923.
G. P. LUNT.
METHOD OF DRYING COLLOIDS.
FILED APR. 7, 1916.
1,450,377.
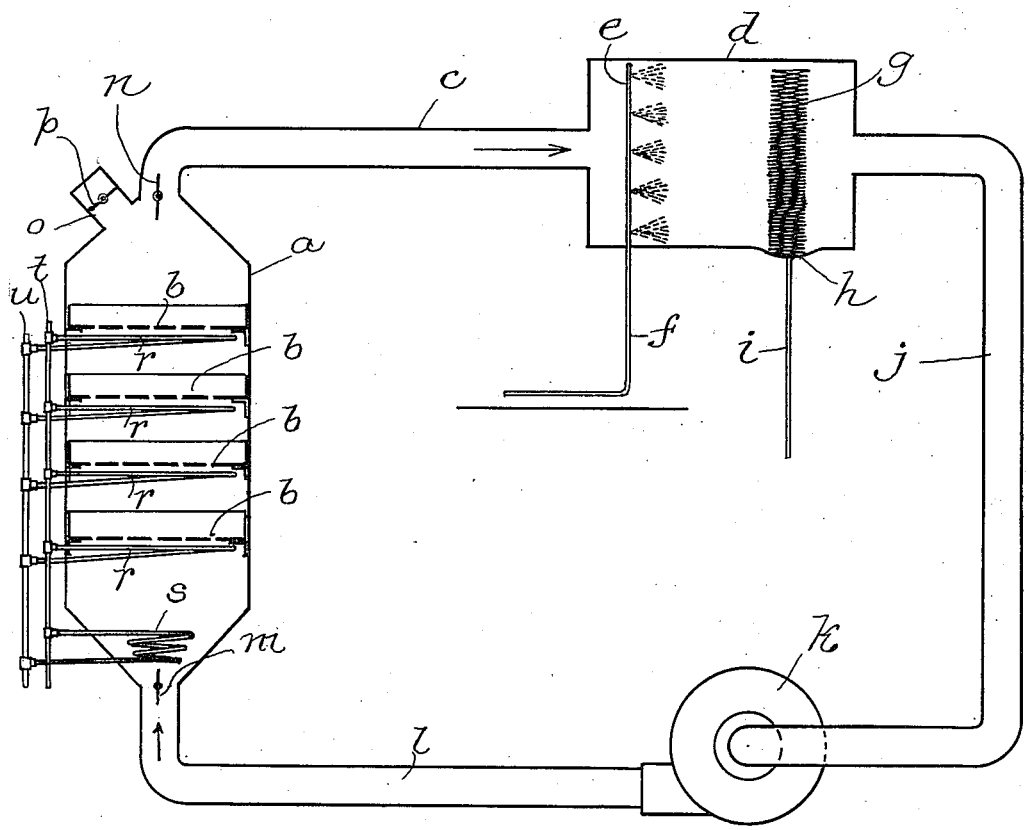
Inventor:
George P. Lunt

Patented Apr. 3, 1923.

1,450,377

UNITED STATES PATENT OFFICE.

GEORGE PERKINS LUNT, OF NEW YORK, N. Y.

METHOD OF DRYING COLLOIDS.

Application filed April 7, 1916. Serial No. 89,680.

*To all whom it may concern:*

Be it known that I, GEORGE P. LUNT, a citizen of the United States, residing at New York, in the county of New York and State of New York, have invented new and useful Improvements in Methods of Drying Colloids, of which the following is a specification.

This invention relates generically to methods of drying colloidal substances and articles, and has particular reference to drying so-called smokeless powder. The primary object of the invention is to furnish a new and improved method by which colloidal substances containing volatile solvents may be dried in a more rapid, efficient, and economical manner than has previously been known; and, as applied to smokeless powders and other highly inflammable substances of the nature indicated, with safety, that is, without liability of causing explosion of the solvent and of the colloidal substance. More specific objects are to dry the material without causing blistering or surface hardening and to recover the solvents liberated by drying.

In the manufacture of articles made of nitrocellulose and other colloidal substances, volatile solvents are used for the purpose of softening or dissolving the substance sufficiently to enable such substance to be formed into the articles of commerce to be produced. Among other products of this nature are the so-called smokeless powders which are made wholly or in part of nitrocellulose, and in the manufacture of which alcohol, ether, acetone, and other volatile solvents are used. Acetone and alcohol are used in making the smokeless powder known as cordite, while ether and alcohol are used in the manufacture of other types of smokeless powder. Other specific solvents are used in making other manufactures of nitrocellulose and other colloidal substances to enable such substances to be molded or deposited in required manners or forms; therefore I include within the scope of the term "solvent" as used in this specification all dissolving agents which are capable of being used for the purposes above indicated.

Before the articles and manufactures hereinbefore referred to can be put to use, the solvents must be removed from them by evaporation; and such removal of solvents is what is meant in this specification by the term "drying." An improved method of thus drying such articles and manufactures, and of recovering the solvents thus removed, constitutes the invention which I claim herein.

The entire method or mode of operation, with which the invention is concerned involves the circulation of a gas past and in contact with the articles or substances to be dried, which gas serves as a vehicle for absorbing and carrying away the vapors removed by evaporation from such substances; heating the substance to the maximum safe point; recovering the solvents from the gaseous vehicle by washing it with a dissolving medium in which such solvents are soluble; the regulation of the rate of evaporation of the solvents in such manner as to prevent blistering of the bodies being dried and also reducing the total time needed for drying to the extent desired; and the use of an inert gas as the vehicle for carrying away the evaporated solvents, whereby to avoid formation of an explosive mixture.

Having thus indicated the nature of the invention for which I here claim protection, I will now proceed with a detailed description of the application of the invention to the specific use of drying smokeless powder, in order to explain in detail a practical embodiment of the principles which I have invented, but without intent to imply thereby any limitation of the invention. In this connection attention is directed to the accompanying drawing showing in a diagrammatic manner an apparatus adapted to be used in carrying out the method in which the invention resides. I will describe the invention with reference to this drawing.

In the drawing, $a$ represents a drying room or chamber which is an enclosed casing or box containing a number of perforated trays or shelves $b-b$ on which the grains of powder are placed. These trays are preferably mounted slidably on suitable guides secured to the side walls of the chamber, so that they may be withdrawn to be filled with wet powder grains and for removal of the dried grains. The side of the chamber through which the shelves may be thus withdrawn is tightly closed by a door or doors when the apparatus is in operation.

$c$ represents a pipe leading from the top of the drying room to a spray box or washing chamber or scrubber $d$, which is kept filled with a fine spray of alcohol, the latter being introduced through nozzles from a bank of pipes $e$ within the box, which are fed by a supply pipe or pipes $f$. $g$ represents a baffle between the spray pipes $e$ and the outlet of the spray box, so constructed as efficiently to separate the minute particles of condensed ether and alcohol from the flowing gas. Any of the baffles now used for separating gas from finely divided liquid particles may be employed for the purpose. $h$ represents a pocket or trough in the bottom of the spray box for collection of the condensed ether and alcohol dripping from the baffle, and $i$ is a pipe which conducts this liquid to a receptacle.

An exhaust pipe $j$ leads from the outlet of the spray box to a fan or pump $k$, or any other motor capable of maintaining a flow of gas and being also regulatable to govern the speed of flow. This fan or blower draws the gas from the top of the drying room through the spray box, and forces it through a conduit $l$ to the bottom of the drying room. At the inlet and outlet of the drying room are dampers $m$ and $n$, respectively, which are arranged to close the conduits $l$ and $c$, respectively, to prevent escape of the drying gas when the drying room is opened for charging or discharging. $o$ represents a second outlet from the top of the drying room, which is controlled by a damper $p$. This outlet is closed during the drying operation, but may be opened to enable air which has been admitted to the drying room during charging of the same to be expelled by displacement.

Heating coils $r$ are provided for heating the powder on the respective shelves and an additional coil $s$ is arranged in the lower part of the drying room adjacent to the inlet thereof for the purpose of heating the incoming gas which is used for drying. These heating coils are connected with circulating pipes $t$, $u$ and may be fed by steam or any other heated fluid at any desired degree of temperature.

Having thus described the principles of the apparatus utilized in the practice of my invention, I will now describe the operation as carried out by my method.

For the drying agent, or vehicle, I use an inert gas, or in other words a gas which under the conditions obtaining in a solvent recovery system will not form an explosive mixture with the vapor of the solvents. For the specific purpose indicated it is important that the gas should contain no free oxygen or any gas capable of combining easily, with evolution of heat, with the solvent. I prefer to use as the gas for this purpose either carbon dioxide ($CO_2$) or sulphur dioxide ($SO_2$), as these gases are inert and are readily obtainable at low cost. They have the further advantage of being heavier than air whereby they are capable, when admitted to the drying room, of displacing any air which may be already therein and forcing it through the outlet $o$. Of course, any other gas which answers the above definition may be used instead of those specifically named.

The inert gas is propelled by the blower or pump $k$ through the drying room, in which it flows in contact with the heated grains of powder, and thence to the spray box, where it is saturated with alcohol.

The function of the alcohol spray is to remove vapors of ether and alcohol carried by the gas. It performs this function by both dissolving these vapors and condensing them. This feature of the invention, stated generically, consists in the removal of any vapor from any gaseous vehicle by washing the vehicle with any liquid dissolving medium in which the vapor is soluble; and it includes specifically so washing the gas with the liquid of the vapor; using a different liquid from that of the vapor as the dissolving medium; and, in the case where two or more vapors are mixed in the vehicle, using a dissolving medium which is the liquid of one of the vapors and in which the other vapor or vapors is or are soluble. All of these characteristics of the invention are evidently exemplified in the illustration hereinbefore described, for alcohol, the dissolving medium mentioned, is the liquid of one of the vapors, and it is also different from the liquid of one of the vapors (ether) but is capable of dissolving such vapor. An additional feature consists in the fact that the dissolving medium before being brought into contact with the gaseous vehicle is chilled to a temperature lower than that of the vehicle, whereby to cause condensation to a greater or less extent of the vapor of the dissolving medium and to more readily dissolve and condense the vapor of the different solvent. Without limiting the invention as to the dissolving medium employed or the temperature to which it is brought by refrigeration, I will say that, when using alcohol as the dissolving medium or washing agent for the purpose set forth, I prefer to chill the alcohol to as low a temperature as it can be brought by common refrigerating means, for instance, a temperature of $-30°$ C. So far as the feature of chilling the alcohol is concerned, cooling to any temperature below that of the gaseous vehicle is within the scope of the invention; and it is to be understood that the temperature and also the rate of delivery of this, or any other, dissolving medium which is delivered to the spray box or condenser may be regulated at will, although as means for effecting such regulation are not susceptible of simple diagrammatic illustration, I have not attempted to show any such in the drawing. The fog of alcohol and dissolved and condensed ether is removed from the gas by the strainer or baffle *g* and drops into the trough *h* from which it is carried away by the pipe *i* for further use. The gas practically freed of these vapors, now flows to the pump and thence to the drying room to repeat the cycle already described.

The results obtained by my invention depend upon principles which may be thus stated:

First, that the rate of diffusion of the solvents through colloids, and therefore the rate of drying, increases rapidly with rise in temperature of the colloid;

Second, that by regulating the vapor content of the solvent in the drying gas, the rate of evaporation from the surface of the colloid can be made approximately equal to the rate of diffusion of the solvent through the mass of the colloid, thereby preventing blistering;

Third, that the vapor pressure of a solution in the dissolving medium of ether, or other solvent, is approximately equal to the product of the vapor pressure of the pure solvent multiplied by its fractional content in the solution, that is, for example, a 1% ether solution in alcohol has a vapor pressure of about one one-hundredth part of the vapor pressure of pure ether at the same temperature, whereby condensation of such vapor by solution takes place at a temperature much higher than that at which the vapor of the pure solvent will be condensed by chilling alone;

Fourth, that in a case where the vapors of two or more solvents are removed from the gas by washing with the liquid of one of them as the dissolving medium, the proportions of the several solvents so removed may be varied at will by regulating the temperature and volume of the dissolving medium, the proportion of the vapor of the dissolving medium so removed being greater or less according as the temperature of the medium is respectively low or high, and the proportion of the other vapor so removed being greater or less according as the volume of the dissolving agent acting on a given quantity of the gas is relatively great or small, respectively;

Fifth, that the relative evaporation of the several solvents from the material being dried is dependent upon the proportional content of the vapor of such solvent in the drying gas, the evaporation of that solvent which is high in concentration in the gas being slower than that of the solvent of which the vapor concentration of the gas is low, and vice versa;

Sixth, that the use of inert gas as the drying agent excludes possibility of an explosive mixture with the evaporated solvents being formed, and so obviates danger of accidental ignition.

By applying these principles, and appropriately regulating the rate of flow of the drying gas past the material being dried, the vapor concentration of the several solvents in the gas is made such respectively that each solvent is evaporated from the colloidal material at a rate substantially equal to its rate of diffusion through the material. Whenever it is found that either or all of the solvents is evaporating too rapidly, the result of which is shown by surface drying and blistering of the material, appropriate adjustment is made to bring to the proper value the vapor concentration in the gas of that solvent which is evaporating too rapidly. Lowering or raising the temperature of the dissolving medium in the condenser causes more or less respectively of the vapor of that fluid to be condensed from the gas, assuming that the dissolving medium is the liquid of one of the solvents; while increasing or diminishing the volume of the dissolving medium has a similar effect on the other solvent or solvents. Thus, with reference to the specific application of the invention hereinbefore described, by raising the temperature of the powder being dried to the maximum safe point, using refrigerated alcohol as the dissolving medium and regulating its temperature and volume, the time of drying is materially decreased, the proportion of solvents recovered from the drying gas is increased, danger of blistering the powder is obviated, and a better product than formerly is secured; and by using inert gas all danger of an explosive mixture being formed is excluded. All or a number of these results are likewise obtainable by the application of the invention to other specific uses of the same general character.

What I claim and desire to secure by Letters Patent is:

1. The method of drying colloidal material containing a volatile solvent, which consists in passing a gas adapted to serve as a vehicle for said solvent past and in contact with the colloidal material, and constantly maintaining the vapor content of the gas at such a degree of concentration that the rate of evaporation from the surface of the material being dried is substantially equal to the rate of diffusion of the solvent through the mass of the material.

2. The method of drying colloids containing an inflammable solvent which consists in causing a gas capable of evaporating the solvent to flow past the material to be dried, and constantly maintaining the vapor content of the gas at such a degree that the evaporation from the surface of the colloid is substantially equal to the rate of diffusion of the solvent through the material.

3. The method of drying colloids containing a volatile solvent, which consists in heating the material, passing an inert gas adapted to serve as a vehicle for the vapor of said solvent past and in contact with the heated colloidal material in a closed circuit, whereby the same gas is caused to make contact repeatedly with the material, and constantly removing such vapors from the gas at a rate regulated to maintain the vapor content of the gas at such degree of concentration that the rate of surface evaporation from the material is substantially equal to the rate of diffusion of the solvent through the mass of the material.

4. The method of drying smokeless powder containing inflammable volatile solvent which consists in heating the powder to the maximum safe point, causing an inert gas to flow repeatedly in contact with the heated powder, and removing vapors of the solvent from said gas between successive contacts of the gas with the powder, in quantities regulated to cause a predetermined vapor concentration of the solvent therein.

5. The method of drying colloidal material containing a number of volatile solvents, which consists in passing a gas adapted to serve as a vehicle for such solvents past and in contact with the material being dried, and washing the gas with a refrigerated dissolving medium in which such solvents are soluble, whereby to dissolve and condense the vapors of such solvents carried by said gas.

6. The method of drying colloidal material containing a number of volatile solvents, which consists in passing a gas adapted to serve as a vehicle for such solvents past and in contact with the material being dried, and washing the gas with a dissolving medium in which such solvents are soluble, whereby to dissolve and condense the vapors of such solvents carried by said gas, regulating the quantity and temperature of said dissolving medium acting upon a given volume of gas whereby to diminish the vapor concentration in the gas of any selected one of said solvents to a predetermined degree, and returning the gas after washing into further contact with the material.

7. The method of drying colloids containing a plurality of volatile solvents soluble in one another which consists in passing a gas adapted to serve as a vehicle for the solvents past and in contact with the substance being dried, and washing the gas with the liquid of one of the solvents refrigerated to a low temperature, whereby to condense the vapor of such solvent in the gas and to dissolve the vapor of the other solvent.

8. The method of drying colloids containing in solution alcohol and another solvent, which is soluble in alcohol, and recovering the solvents, which consists in passing a gas in contact with the substance to be dried, and washing the gas with refrigerated alcohol to condense the vapors of alcohol and dissolve the vapors of the other solvent, in the gas.

9. The method of drying colloids containing in solution alcohol and another solvent, which is soluble in alcohol, and recovering the solvents, which consists in passing a gas in contact with the substance to be dried, washing the gas with refrigerated alcohol at such temperature and in such volume as to condense and dissolve from the gas a predetermined proportion of the vapor content of both solvents in the gas, and returning the gas after washing into contact with the material being dried.

10. The method of drying colloids containing a plurality of volatile solvents which consists in passing a gas adapted to serve as a vehicle for the solvents past and in contact with the substance being dried, washing the gas with the liquid of one of the solvents at a lower temperature than the gas, whereby to condense the vapor of such solvent in the gas and to dissolve the vapor of the other solvent, returning the gas after washing into renewed contact with the substance, and regulating the temperature and volume of the washing fluid and the rate of flow of the gas past the substance to such quantities that the rate of evaporation of all the solvents is substantially equal to the rate of diffusion of the respective solvents through the mass of the substance.

11. The method of drying colloids containing in solution alcohol and another solvent, which is soluble in alcohol, and recovering the solvents, which consists in passing a gas in contact with the substance to be dried, washing the gas with refrigerated alcohol, returning the gas after washing into renewed contact with said substance, and regulating the temperature and volume of the alcohol acting on a given volume of gas, and the rate of flow of the gas past the substance, to values such that the gas is caused to evaporate the solvents at a rate substantially equal to the rate of diffusion of the solvents through the substance.

12. The method of drying smokeless powder containing ether and alcohol which consists in causing a current of gas to flow in contact with the powder, passing the gas through a spray of alcohol to remove the vapors carried by the gas, and returning the gas into contact with the powder.

13. The method of recovering alcohol and ether from smokeless powder which consists in causing a stream of inert gas to flow through a drying room containing the powder, conducting the gas from such drying room to a condensing chamber, washing the gas with a spray of alcohol to partly remove the vapors of alcohol and ether by condensation and solution, and returning the gas thus partly freed of vapor to the drying room.

14. The method of recovering alcohol and ether from smokeless powder which consists in causing a stream of inert gas to flow through a drying room containing the powder, conducting the gas from such drying room to a condensing chamber, washing the gas with a spray of alcohol to partly remove the vapors of alcohol and ether by condensation and solution, returning the gas thus partly freed of vapor to the drying room and controlling the rate of evaporation of such alcohol and ether from the powder by regulating the speed at which the gas is carried past the powder.

15. An apparatus comprising a drying room, a washing chamber, a conduit leading from the drying room to the washing chamber, a conduit leading from the washing chamber to the drying room, means for maintaining a flow of gas through the circuit constituted by said room, chamber, and conduits, and means for maintaining a spray of liquid in said chamber.

In testimony whereof I have affixed my signature.

GEORGE PERKINS LUNT.